United States Patent
Iseki et al.

(10) Patent No.: US 10,118,555 B2
(45) Date of Patent: Nov. 6, 2018

(54) LAMP-EQUIPPED VEHICLE OUTER MIRROR

(71) Applicants: MURAKAMI CORPORATION, Shizuoka (JP); TOYOTA JIDOSHA KABUSHIKI KAISHA, Aichi (JP)

(72) Inventors: Kota Iseki, Shizuoka (JP); Toshihiko Nishimura, Nisshin (JP); Michio Yasuda, Nagakute (JP); Panida Ritkeaw, Bangkaew Bangplee Samutprakarn (TH)

(73) Assignees: MURAKAMI CORPORATION, Shizuoka (JP); TOYOTA JIDOSHA KABUSHIKI KAISHA, Aichi (JP)

( * ) Notice: Subject to any disclaimer, the term of this patent is extended or adjusted under 35 U.S.C. 154(b) by 63 days.

(21) Appl. No.: 15/329,290

(22) PCT Filed: Jul. 24, 2015

(86) PCT No.: PCT/JP2015/071149
§ 371 (c)(1),
(2) Date: Jan. 26, 2017

(87) PCT Pub. No.: WO2016/017554
PCT Pub. Date: Feb. 4, 2016

(65) Prior Publication Data
US 2017/0210298 A1    Jul. 27, 2017

(30) Foreign Application Priority Data
Jul. 28, 2014  (JP) ................................. 2014-153301

(51) Int. Cl.
*B60R 1/12*     (2006.01)
*F21S 43/00*    (2018.01)
(Continued)

(52) U.S. Cl.
CPC .......... *B60R 1/1207* (2013.01); *B60Q 1/2665* (2013.01); *B60Q 1/2696* (2013.01);
(Continued)

(58) Field of Classification Search
CPC ...................................... B60R 1/1207
See application file for complete search history.

(56) References Cited

U.S. PATENT DOCUMENTS

| 5,659,423 A * | 8/1997 | Schierbeek ........... B60R 1/0602 |
|---|---|---|
| | | 359/602 |
| 2005/0146886 A1 | 7/2005 | Furuya et al. |
| 2011/0157907 A1* | 6/2011 | Hwang ................ B60Q 1/2665 |
| | | 362/494 |

FOREIGN PATENT DOCUMENTS

| JP | 2003-132709 | 5/2003 |
|---|---|---|
| JP | 2004-210236 | 7/2004 |
| JP | 2005-190716 | 7/2005 |

OTHER PUBLICATIONS

Search Report issued in World Intellectual Property Organization Patent Application No. PCT/JP2015/071149, dated Oct. 6, 2015, along with an english translation thereof.
(Continued)

*Primary Examiner* — Anabel Ton
(74) *Attorney, Agent, or Firm* — Greenblum & Bernstein, P.L.C.

(57) ABSTRACT

This invention provides a lamp-equipped vehicle outer mirror in which a phenomenon is less likely to occur, the phenomenon being the one in which light emitted from a lamp appears in a light emission pattern that is different from that intended by a designer. A side turn signal lamp is incorporated in a minor housing. A downward inclined surface is formed at a position above a lens of the side turn signal lamp in the mirror housing. The downward inclined surface is inclined obliquely downward and is lustrous. A
(Continued)

part of turn signal lamp light emitted from the lens to an external field is reflected by the downward inclined surface. A relative positional relationship between the lens and the downward inclined surface is set so that the reflected light passes through an area on an upper side relative to a horizontal direction.

8 Claims, 4 Drawing Sheets (51) Int. Cl.
    *B60Q 1/34*     (2006.01)
    *B60R 1/06*     (2006.01)
    *B60Q 1/26*     (2006.01)

(52) U.S. Cl.
    CPC .................. *B60Q 1/34* (2013.01); *B60R 1/06* (2013.01); *F21S 43/00* (2018.01)

(56) References Cited

OTHER PUBLICATIONS

Written Opinion of the International Search Authority issued in World Intellectual Property Organization Patent Application No. PCT/JP2015/071149 dated Oct. 6, 2015, along with an english tranlsation thereof.

* cited by examiner

LAMP-EQUIPPED VEHICLE OUTER MIRROR

The disclosure of Japanese Patent Application No. JP2014-153301 filed on Jul. 28, 2014, including the specification, drawings, claims and abstract is incorporated herein by reference in its entirety.

TECHNICAL FIELD

This invention relates to a lamp-equipped vehicle outer mirror including a lamp disposed in a mirror housing, the vehicle outer mirror being less likely to cause a phenomenon in which light emitted from a lamp appears in a light emission pattern that is different from that intended by a designer, to other vehicles and pedestrians due to a shape of an outer casing of the mirror housing.

BACKGROUND ART

Figure 1:
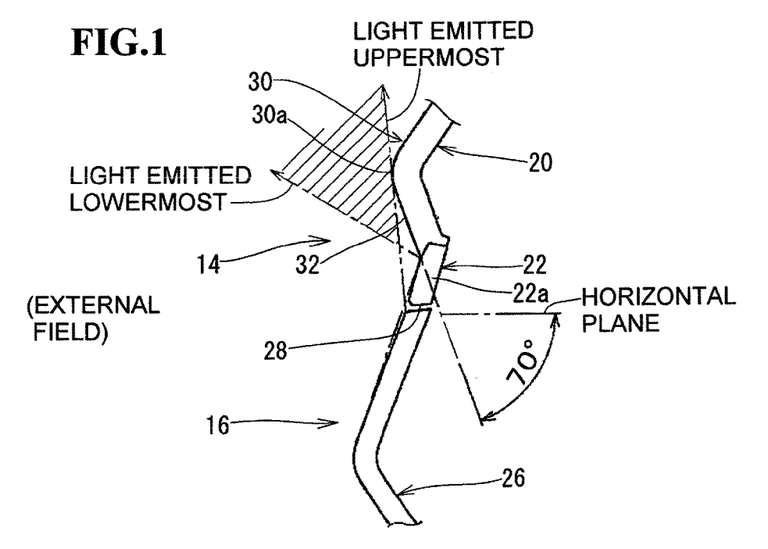
FIG. 1 is a diagram illustrating a cross-sectional shape of a surface area along arrow A-A in the door mirror in FIG. 3.
Figure 2:
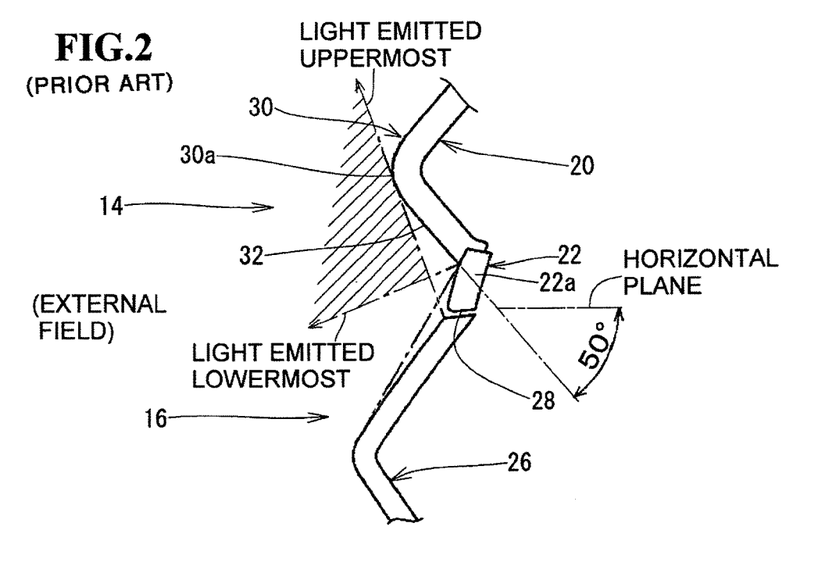
FIG. 2 is a diagram illustrating cross-sectional shapes of a housing and a lens of a side turn signal lamp in a conventional lamp-equipped door mirror that is a product of the present applicant's, which illustrates a cross-sectional shape along a line at a position corresponding a position of arrow A-A in FIG. 3 illustrating an embodiment of this invention.
Figure 3:
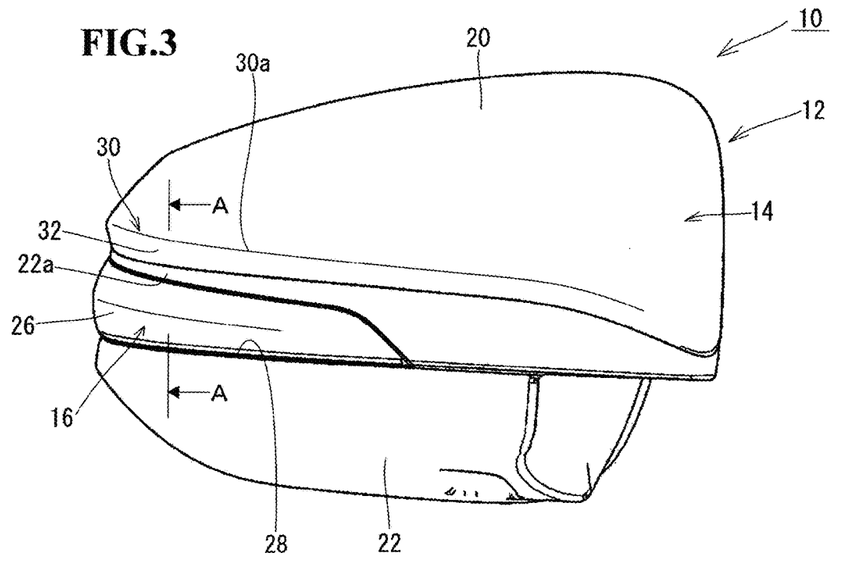
FIG. 3 is a diagram illustrating an embodiment of a turn lamp-equipped right-side door mirror according to this invention, which is a view of the door mirror as viewed from the front of an outer casing of the mirror housing.

FIG. 2 illustrates a cross sectional shape of a housing and a lens of a side turn signal lamp in a conventional lamp-equipped door mirror that is a product of the present applicant's. This is a cross-sectional shape along a line at a position corresponding to a position of arrow A-A in later-described FIG. 3 illustrating an embodiment of this invention. In FIG. 2, for parts that are in common with those of FIG. 1 illustrating a cross-section along arrow A-A in FIG. 3, reference numerals that are common with those used FIG. 1 are used. A side turn signal lamp 16 is incorporated in a mirror housing 14. Turn signal lamp light is emitted outward from a lens 26 included in a light emitting section of the side turn signal lamp 16. An outer casing of the mirror housing 14 includes a lower cover 22 forming a lower part of the outer casing and an upper cover 20 forming an upper part of the outer casing. The surface of the lower cover 22 is formed of a non-coated, non-plated surface having a dark color. In other words, the surface of the lower cover 22 is formed of a surface in which a plastic material forming the lower cover 22 is exposed, for example, a lusterless surface such as a matte surface. The surface of the upper cover 20 is formed of a decorative metal plated surface (mirror surface) that is lustered in silver white by chrome plating. A transversely-extending projection 30 is formed at a position above the lens 26 in the upper cover 20, mainly for appearance design enhancement. Along with the formation of this projection 30, a downward inclined surface 32 that extends transversely and is inclined obliquely downward is formed on the lower side of a top 30a of the projection 30. The lower cover 22 includes a part 22a disposed between the downward inclined surface 32 of the upper cover 20 and the lens 26. Hereinafter, this part 22a is referred to as "intermediately-disposed part".

CITATION LIST

Patent Literature

Patent Literature 1: Japanese Patent Laid-Open No. 2004-210236

SUMMARY

Technical Problem

In the conventional lamp-equipped door mirror in FIG. 2, a part of the turn signal lamp light emitted from the lens 26 toward the external field is reflected by the lustrous downward inclined surface 32, which is formed of a plated surface, and emitted to the front side and the lateral side of the vehicle. The hatching in FIG. 2 indicates an area in vertical direction in which the light reflected by the downward inclined surface 32 is emitted. According to this, reflected light resulting from turn signal lamp light being reflected by the downward inclined surface 32 is emitted toward the front side and the lateral side of the vehicle in a wide area ranging from the lower side to the upper side relative to the horizontal direction. This reflected light is not too blight for other vehicles and/or pedestrians. However, a designer of the door mirror designed this door mirror with an intention to provide turn signal lamp light appearing in a light emission pattern in which only the lens 26 glows bright, to other vehicles and/or pedestrians. Therefore, the reflected light from the downward inclined surface 32 appearing bright simultaneously with the turn signal lamp light is not favorable because the turn signal lamp light appears in a light emission pattern that is different from the intended one. In particular, the surface of the upper cover 20 including the downward inclined surface 32 of this door mirror is formed of a lustrous, plated surface (mirror surface), and thus, the light reflected by the downward inclined surface 32 is conspicuous. Also, in the design in FIG. 2, the intermediately-disposed part 22a of the lower cover 22 is disposed between the lens 26 and the upper cover 20. The surface of the intermediately-disposed part 22a is formed of, for example, a dark matte surface (lusterless surface), and thus, the surface causes no reflection such as caused by a lustrous surface. As a result, the turn signal lamp light appears in such a manner that light is divided in two, upper and lower, parts (that is, the downward inclined surface 32 and the lens 26) across the intermediately-disposed part 22a of the lower cover 22, resulting in the problem of poor appearance of the turn signal lamp light.

This invention is intended to provide a lamp-equipped vehicle outer mirror that has solved the aforementioned problem in the conventional technique. In other words, this invention is configured so as to, while keeping a lustrous downward inclined surface disposed at a position above a light emitting section in an outer casing of a mirror housing, be less likely to cause a phenomenon in which light emitted from a lamp is reflected by the downward inclined surface and viewed by other vehicles and/or pedestrians. As a result of making that phenomenon less likely to occur, a phenomenon in which the light from the lamp appears in a light emission pattern that is different from that intended by a designer becomes less likely to occur.

Here, the technique described in Patent Literature 1 is one configured so as to emit turn signal lamp light to the external field in a horizontal direction after the turn signal lamp light being reflected by an inclined surface of a mirror housing intentionally, instead of emitting turn signal lamp light directly to the external field in the horizontal direction through a lens.

Solution to Problem

This invention provides a lamp-equipped vehicle outer mirror including a mirror housing with a lamp incorporated therein, the vehicle outer mirror including a light emitting section in a front face and/or a side face of the mirror housing as viewed from a front side of a vehicle in a state in which the vehicle outer mirror is mounted in the vehicle and the mirror housing is in a use position, the light emitting section emitting light of the lamp toward an external field, wherein the mirror housing includes a lustrous downward inclined surface in an outer surface at a position above the light emitting section, the downward inclined surface being inclined obliquely downward, and a relative positional relationship between the light emitting section and the downward inclined surface is set so that, in the state in which the vehicle outer mirror is mounted in the vehicle and the mirror housing is in the use position, the light emitted from the light emitting section and reflected by the downward inclined surface is emitted substantially toward an area on an upper side relative to a horizontal direction in the external field. Accordingly, even if light emitted from the lamp is reflected by the lustrous downward inclined surface of the housing, the reflected light is emitted substantially toward the area on the upper side relative to the horizontal direction in the external field. Thus, the reflected light cannot be seen from infinity in the horizontal direction, and therefore, the reflected light is less likely to be viewed by other vehicles and/or pedestrians. Therefore, it is possible to, while keeping the downward inclined surface disposed in the mirror housing, make a phenomenon in which light emitted from the lamp appears in a light emission pattern that is different from that intended by a designer as viewed from other vehicles and/or pedestrians less likely to occur.

In this invention, it is possible that the mirror housing includes a lusterless surface or a surface having an inclination angle that is different from that of the downward inclined surface in an outer surface between the downward inclined surface and the light emitting section. Where the mirror housing has such structure, if reflected light from the lustrous downward inclined surface is emitted in a direction including the horizontal direction in the external field, the lamp light may appear in a light emission pattern in which the light is intense at the light emitting section and the downward inclined surface and not intense at the surface between the light emitting section and the downward inclined surface, that is, the lusterless surface or the surface having an inclination angle that is different from that of the downward inclined surface, as viewed from other vehicles and/or pedestrians. In this case, the lamp light appears in a light emission pattern in which the light is divided in upper and lower parts, as viewed from other vehicles and/or pedestrians, resulting in poor appearance of the lamp light. On the other hand, according to this invention, even if the mirror housing includes the lusterless surface or the surface having an inclination angle that is different from that of the downward inclined surface between the light emitting section and the downward inclined surface, reflected light from the downward inclined surface is emitted substantially toward the area on the upper side relative to the horizontal direction in the external field, and the reflected light is thus less likely to be viewed by other vehicles and/or pedestrians. Therefore, the lamp light is prevented from appearing in a light emission pattern in which the light is divided in upper and lower parts, and as a result, poor appearance of the lamp light is prevented.

In this invention, it is possible that the downward inclined surface of the mirror housing includes a plated surface. If the downward inclined surface includes a plated surface, this invention exerts a larger effect because the reflected light resulting from the lamp light being reflected by the downward inclined surface is intense compared to a case where the downward inclined surface includes a non-plated surface.

In this invention, it is possible that the relative positional relationship between the light emitting section and the downward inclined surface is set so that the lamp light reflected by the downward inclined surface passes through an area above a position of 190 cm from a ground surface in a vertical direction at a position 1 m away from a position of the reflection in the horizontal direction. Accordingly, it is possible that the reflected light of the lamp from the downward inclined surface cannot be viewed even by a tall pedestrian unless the pedestrian comes very close to the vehicle.

In this invention, it is possible that an angle of the downward inclined surface relative to a horizontal plane is set to be no less than 70 degrees. Accordingly, it is possible to make the reflected light of the lamp from the downward inclined surface less likely to be viewed.

In this invention, it is possible that the mirror housing includes a projection at a position above the light emitting section, and the downward inclined surface is formed on a lower side of a top of the projection. Accordingly, in a case where a shape including a projection at a position above the light emitting section is employed as a design shape of the mirror housing, also, it is possible to make the lamp light reflected by the downward inclined surface formed on the lower side of a top of the projection less likely to be viewed by other vehicles and/or pedestrians.

In this invention, it is possible that the mirror housing includes a lower cover forming a lower part of an outer casing of the mirror housing, and an upper cover forming an upper part of the outer casing of the mirror housing, the downward inclined surface is included in the upper cover, and the upper cover includes an outer surface having a specular reflectivity that is higher than that of an outer surface of the lower cover. Accordingly, the downward inclined surface is formed in the upper component of the housing, the upper component including an outer surface having a high specular reflectivity, and thus, an intensity of the reflected light of the lamp from the downward inclined surface is high. However, according to this invention, the reflected light from the downward inclined surface is emitted substantially toward the area on the upper side relative to the horizontal direction in the external field, and thus, the reflected light is less likely to be viewed by other vehicles and/or pedestrians. Therefore, a housing outer casing structure in which the upper cover includes a lustrous surface (flat and smooth surface) provided by, e.g., lustrous plating or lustrous coating and the lower cover includes a lusterless surface (non-flat and non-smooth surface) that is, e.g., not plated and matte can be employed without inconvenience.

In this invention, it is possible that the lower cover includes a part disposed between the downward inclined surface and the light emitting section, and the part includes the lusterless surface or the surface having an inclination angle that is different from that of the downward inclined surface. Accordingly, despite the lower cover including the lusterless surface or the surface having an inclination angle that is different from that of the downward inclined surface between the downward inclined surface and the light emitting section, reflected light from the downward inclined surface is emitted substantially toward the area on the upper side relative to the horizontal direction in the external field, and the reflected light is thus less likely to be viewed by other vehicles and/or pedestrians. Therefore, the lamp light is prevented from appearing in a light emission pattern in which the light is divided in upper and lower parts, and as a result, poor appearance of the lamp light is prevented.

DESCRIPTION OF EMBODIMENT

Figure 4:
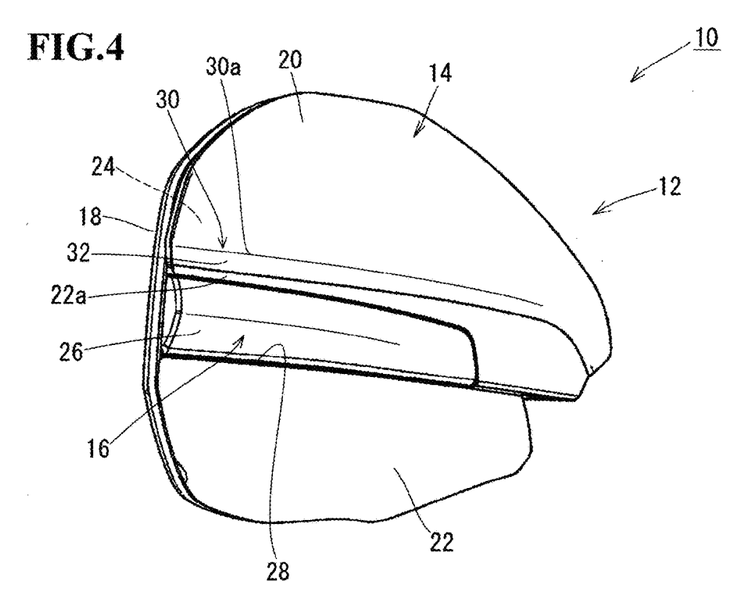
FIG. 4 is a diagram illustrating the door mirror in FIG. 3, which is a view of the door mirror as viewed from a position on the lateral side of the outer casing of the mirror housing, the position being slightly close to the front side.

An embodiment of this invention will be described below. FIGS. 3 and 4 illustrate a turn lamp-equipped right-side door mirror 10 according to this invention. Here, FIGS. 3 and 4 illustrate only a mirror rotating part 12 of the door mirror 10, and illustration of a mirror fixing part (mirror base) that fixedly supports the mirror rotating part 12 so as to be rotatable relative to a right-side door of the vehicle is omitted. The mirror rotating part 12 is supported so as to be horizontally rotatable relative to the mirror fixing part, and is positioned selectively at either of a use position (developed position) and a non-use position (folded position). In a state in which the door mirror 10 is mounted in the vehicle and the mirror rotating part 12 is in the use position, FIG. 3 illustrates the door mirror 10 as viewed from a position on the front side of the vehicle, and FIG. 4 illustrates the door mirror 10 as viewed from a position on the right side of the vehicle, the position being slightly close to the front side.

In FIGS. 3 and 4, the mirror rotating part 12 includes a mirror housing 14 and a side turn signal lamp 16 incorporated and fitted in the mirror housing 14. The mirror housing 14 includes a body (visor) 18, an upper cover 20 and a lower cover 22. The body 18 forms the front side of the mirror housing 14 (side on which a mirror plate body is disposed). The upper cover 20 and the lower cover 22 form an outer casing of the mirror housing 14. Of these covers, the upper cover 20 forms an upper part of the outer casing, and the lower cover 22 forms a lower part of the outer casing. Each of the body 18 and the lower cover 22 is formed of a molding of, for example, a plastic material having a dark color such as black. The surface of each of the body 18 and the lower cover 22 is, for example, not coated and the dark-color plastic material is exposed in the surface. The surface of the lower cover 22 is formed of, for example, a matte surface. The upper cover 20 is formed of a molding of a plastic material. The surface of the upper cover 20, the surface being exposed to the external field, is formed of a decorative metal plated surface (mirror surface) that is lustered in, e.g., silver white by, e.g., chrome plating.

The side turn signal lamp 16 includes a light source (not illustrated) such as an LED inside. The side turn signal lamp 16 emits a light beam (turn signal lamp light) emitted from the light source to the external field through the lens 26 included in the light emitting section, the lens 26 being formed of a transparent plastic. The lens 26 is disposed so as to transversely extend continuously from a front face to a side face of the mirror housing 14 in an area in an upper portion of the lower cover 22, the area being a rough center in a vertical direction of the mirror housing 14, the lens 26 being curved in a transverse direction so as to conform to an outer shape of the mirror housing 14. The area in the upper portion of the lower cover 22 is cut out and thereby forms an opening 28 that allows disposition of the lens 26. Along with disposition of the lens 26 in the opening 28 formed in the lower cover 22, an intermediately-disposed part 22a is disposed between an upper edge of the lens 26 and a lower edge of the upper cover 20. The intermediately-disposed part 22a is formed by a part of the lower cover 22 (part positioned on the upper side of the opening 28), extends transversely in an elongated shape and is exposed to the external field. Therefore, the upper cover 20 is disposed on the upper side of the intermediately-disposed part 22a.

Figure 5:
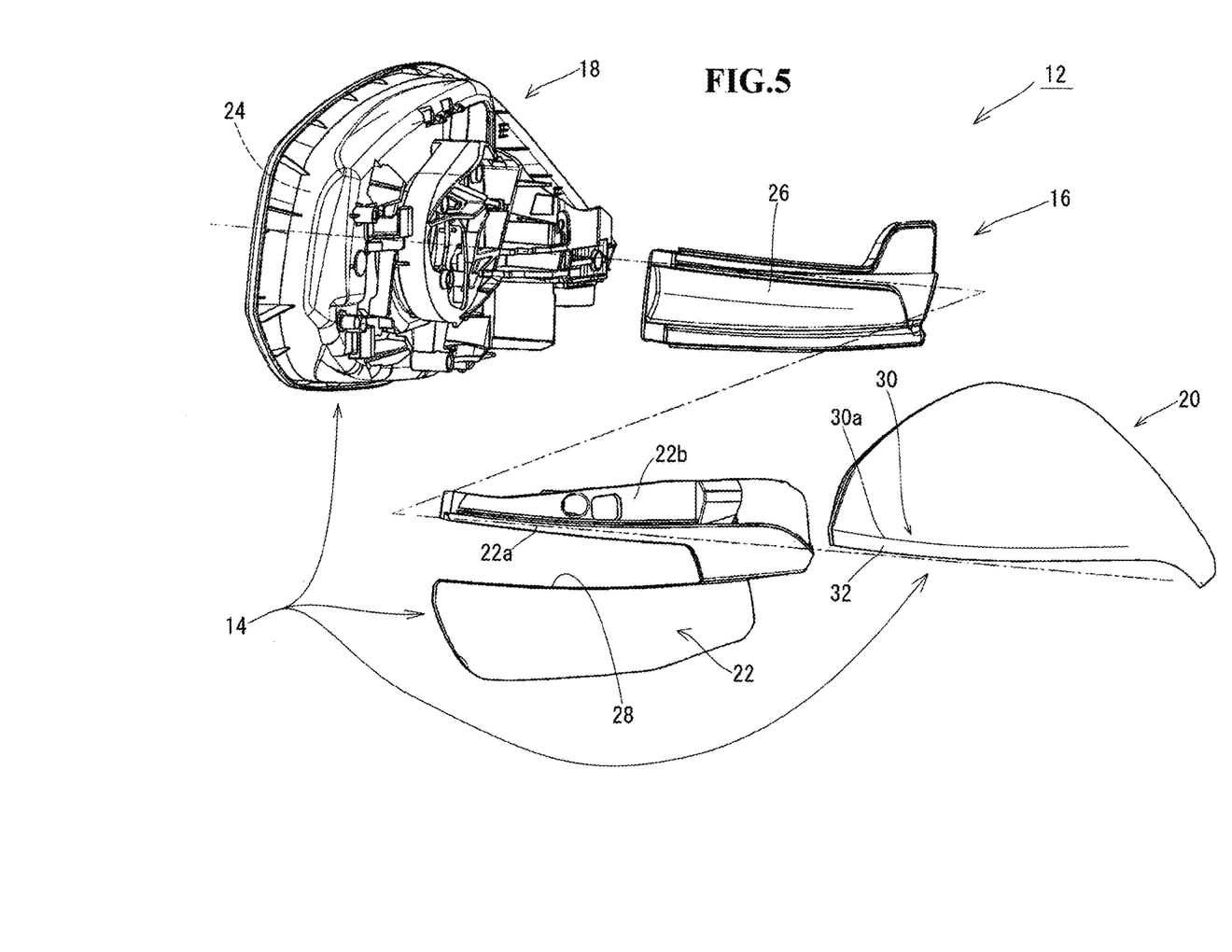
FIG. 5 is an exploded perspective view of the door mirror in FIGS. 3 and 4.

FIG. 5 illustrates the mirror rotating part 12 in an exploded state. The body 18 includes a recess 24 on the front side. A frame with, e.g., a power folding unit and a mirror surface angle adjustment actuator fixed thereto (none of these components illustrated) is received in the recess 24 and fixed to the body 18. The power folding unit supports the mirror rotating part 12 on the mirror fixing part such that the mirror rotating part 12 is rotatable relative to the mirror fixing part, and moves the mirror rotating part 12 between the use position and the non-use position by means of driving of a motor. A mirror holder that holds the mirror plate body is attached to the mirror surface angle adjustment actuator. The mirror surface angle adjustment actuator turns the mirror holder vertically and horizontally around a predetermined position by means of driving of a motor and thereby adjusts an angle of a mirror surface of the mirror plate body.

The upper cover 20 is disposed on the upper side of the lens 26 with the intermediately-disposed part 22a of the lower cover 22 interposed therebetween. In a lower portion of the upper cover 20, a projection (ridge) 30 that projects outward is formed along the lower edge of the upper cover 20. The projection 30 is formed continuously from a front face to a side face of the upper cover 20 so as to transversely extend along the upper edge of the lens 26. Along with the formation of the projection 30, a downward inclined surface 32 is formed on the lower side of a top 30a of the projection 30. The downward inclined surface 32 is formed of a surface inclined obliquely downward and having luster (that is, formed of a flat and smooth surface). The downward inclined surface 32 is formed continuously from the front face to the side face of the upper cover 20. In the lower cover 22, a cover joining portion 22b is formed on the upper side of the intermediately-disposed part 22a in an integrated manner so as to be continuous with the intermediately-disposed part 22a.

The side turn signal lamp 16 is fixedly attached to a back face of the body 18 by means of screw fastening. In this state, the lower cover 22 is fixedly attached to a lower part of the back face of the body 18 by means of, e.g., hook engagement. Here, the lens 26 of the side turn signal lamp 16 is inserted into the opening 28 of the lower cover 22 and is exposed to the external field. In this state, the upper cover 20 is further fixedly attached to an upper part of the back face of the body 18 by means of, e.g., hook engagement. Here, the cover joining portion 22*b* of the lower cover 22 is hidden behind the lower portion of the upper cover 20. At a position at which the upper cover 20 and the lower cover 22 overlap each other, the upper cover 20 and the lower cover 22 are joined to each other by means of, e.g., hook engagement. Consequently, the lower cover 22 and the upper cover 20 are connected in a surface direction with no gap therebetween. Through the above procedure, the mirror rotating part 12 is assembled in an integrated manner as illustrated in FIGS. 3 and 4.

FIG. 1 illustrates a cross-sectional shape of a surface area along arrow A-A in FIG. 3. In the upper cover 20, the projection 30 is formed. On the lower side of the top 30*a* of the projection 30, the lustrous downward inclined surface 32 inclined obliquely downward is formed. The inclination of the downward inclined surface 32 is sharp (approximately 70 degrees relative to a horizontal surface) compared to the angle of the inclination of the conventional structure in FIG. 2 (approximately 50 degrees relative to the horizontal surface). The lens 26 has a vertical cross-sectional shape projecting forward. The projecting shape extends in a longitudinal direction (here, a transverse direction) of the lens 26. An amount of projection of the projecting shape is set to be small (low) compared to that of the conventional structure in FIG. 2. The intermediately-disposed part 22*a* of the lower cover 22 is interposed and disposed between the lens 26 and the downward inclined surface 32. The surface of the intermediately-disposed part 22*a* is formed so as to be inclined obliquely upward at an angle that is substantially equal to that of the conventional structure in FIG. 2. The angle of inclination of the intermediately-disposed part 22*a* is set to be substantially equal to the angle of inclination of the surface on the upper side of the top of the projecting shape of the lens 26. The surface of the downward inclined surface 32 is formed so as to be a mirror surface (lustrous surface, that is, a flat and smooth surface) provided by metal plating. The surface of the intermediately-disposed part 22*a* is formed of a non-mirror surface (for example, a lusterless surface such as a matte surface, that is, a non-flat and non-smooth surface) provided by a surface in which the dark plastic material of the lower cover 22 is exposed.

Turn signal lamp light emitted to the external field through the lens 26 is emitted directly toward an area in horizontal direction extending continuously on the front side, the lateral side and the rear lateral side of the vehicle. The emitted turn signal lamp light is viewed by other vehicles and/or pedestrians, and also partially falls on and is reflected by the downward inclined surface 32. The hatching in FIG. 1 indicates an area in vertical direction through which reflected light resulting from the turn signal lamp light being emitted from the lens 26 and reflected by the downward inclined surface 32 passes. As can be seen from the figure, an angle and area of emission of the reflected light from the downward inclined surface 32 varies depending on a relative positional relationship between the downward inclined surface 32 and the lens 26 (e.g., the amount of projection of the lens 26, an amount of projection of the projection 30 and/or the angle of inclination of the downward inclined surface 32). According to FIG. 1, although the reflected light of the turn signal lamp light from the downward inclined surface 32 is emitted toward the front side and the lateral side of the vehicle, the reflected light passes through an area on the upper side relative to the horizontal direction and thus is less likely to be viewed by other vehicles (e.g., oncoming vehicles) and/or pedestrians. Therefore, turn signal lamp light appears in a light emission pattern in which only the lens 26 glows bright, to the other vehicles and/or the pedestrians.

Figure 6A:
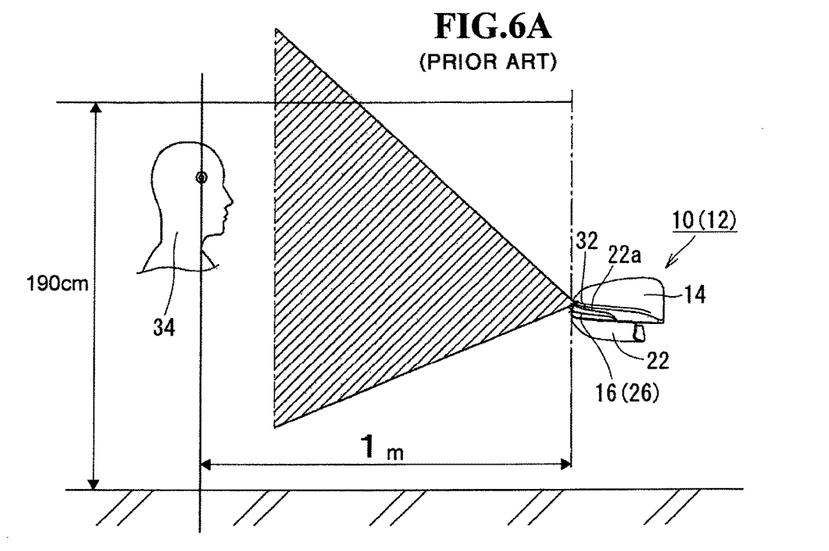
FIG. 6A is a diagram indicating an irradiation area in a vertical direction of reflected light of turn signal lamp light from a downward inclined surface according to the conventional structure in FIG. 2.
Figure 6B:
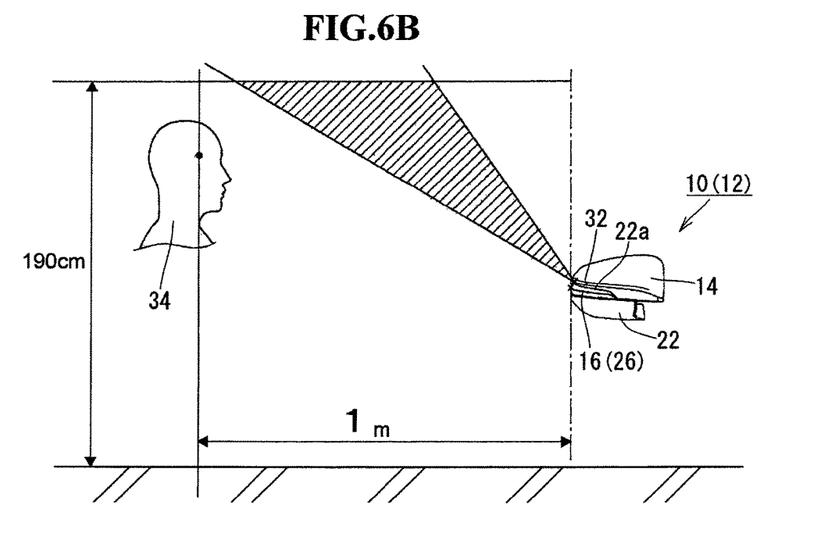
FIG. 6B is a diagram indicating an irradiation area in a vertical direction of reflected light of turn signal lamp light from a downward inclined surface according to the structure of this invention in FIG. 1.

FIGS. 6A and 6B indicate a difference of irradiation area in vertical direction of reflected light of turn signal lamp light from the downward inclined surface 32 between the conventional structure in FIG. 2 and the structure according to this invention in FIG. 1. FIG. 6A indicates an irradiation area according to the conventional structure, and FIG. 6B indicates an irradiation area according to the structure in FIG. 1. It is assumed that a height of the downward inclined surface 32 from a ground surface is 137 cm. According to the conventional structure in FIG. 6A, reflected light resulting from turn signal lamp light being reflected by the downward inclined surface 32 is emitted to a wide area ranging from the lower side to the upper side relative to the horizontal direction. Thus, simultaneously with turn signal lamp light directly coming from the lens 26, the reflected light from the downward inclined surface 32 can be viewed from a pedestrian 34. As a result, the turn signal lamp light appears in a light emission pattern that is different from the light emission pattern in which only the lens 26 glows bright, which is intended by a designer, to the pedestrian 34. On the other hand, according to the structure in FIG. 6B (structure in FIG. 1), the relative positional relationship between the downward inclined surface 32 and the lens 26 is set as described above, and thus, reflected light resulting from turn signal lamp light being reflected by the downward inclined surface 32 passes through the area on the upper side relative to the horizontal direction. In the example in FIG. 6B, a position of a lower limit of the area through which the reflected light passes is located above a position of 190 cm above the ground surface in the vertical direction at a position 1 m away from a position of the downward inclined surface 32 in the horizontal direction. In such positional relationship, even if the pedestrian 34 is tall, the pedestrian 34 cannot see the reflected light from the downward inclined surface 32 as long as the pedestrian 34 is no less than 1 m away from the vehicle. Therefore, in many cases, the turn signal lamp light is viewed in the light emission pattern in which only the lens 26 glows bright, which is intended by the designer, by pedestrians and/or other vehicles.

Although the above embodiment has been described in terms of a case where the lustrous downward inclined surface 32 is a plated surface (mirror surface), this invention is applicable also to a case where the lustrous downward inclined surface 32 is, e.g., a lustrous coating surface or a lustrous surface in which a plastic material is exposed.

Also, although the above embodiment has been described in terms of a case where the lens has a vertical cross-sectional shape projecting forward, this invention is applicable also to a case where the lens has a non-projecting, vertical cross-sectional shape not projecting relative to the mirror housing (for example, a flat vertical cross-sectional shape).

Also, although the above embodiment has been described in terms of a case where the lamp is a side turn signal lamp, this invention is applicable also to a vehicle outer mirror in which a lamp, other than a side turn signal lamp, including a light emitting section disposed in a front face and/or a side face of a mirror housing (for example, a position lamp) is incorporated.

The invention claimed is:

1. A lamp-equipped vehicle outer mirror including a mirror housing with a lamp incorporated therein,
   the vehicle outer mirror comprising a light emitting section in at least one of a front face and a side face of the mirror housing as viewed from a front side of a vehicle in a state in which the vehicle outer mirror is mounted in the vehicle and the mirror housing is in a use position, the light emitting section emitting light of the lamp toward an external field, wherein the mirror housing includes a lustrous downward inclined surface in an outer surface at a position above the light emitting section, the downward inclined surface being inclined obliquely downward, and a relative positional relationship between the light emitting section and the downward inclined surface is set so that, in the state in which the vehicle outer mirror is mounted in the vehicle and the mirror housing is in the use position, the light emitted from the light emitting section and reflected by the downward inclined surface is emitted substantially toward an area on an upper side relative to a horizontal direction in the external field.

2. The lamp-equipped vehicle outer mirror according to claim 1, wherein the mirror housing includes a lusterless surface or a surface having an inclination angle that is different from that of the downward inclined surface in an outer surface between the downward inclined surface and the light emitting section.

3. The lamp-equipped vehicle outer mirror according to claim 1, wherein the downward inclined surface of the mirror housing includes a plated surface.

4. The lamp-equipped vehicle outer mirror according to claim 1, wherein the relative positional relationship between the light emitting section and the downward inclined surface is set so that the lamp light reflected by the downward inclined surface passes through an area above a position of 190 cm from a ground surface in a vertical direction at a position 1 m away from a position of the reflection in the horizontal direction.

5. The lamp-equipped vehicle outer mirror according to claim 1, wherein an angle of the downward inclined surface relative to a horizontal plane is set to be no less than 70 degrees.

6. The lamp-equipped vehicle outer mirror according to claim 1, wherein the mirror housing includes a projection at a position above the light emitting section, and the downward inclined surface is formed on a lower side of a top of the projection.

7. The lamp-equipped vehicle outer mirror according to claim 1, wherein the mirror housing includes a lower cover forming a lower part of an outer casing of the mirror housing, and an upper cover forming an upper part of the outer casing of the mirror housing, the downward inclined surface is included in the upper cover, and the upper cover includes an outer surface having a specular reflectivity that is higher than that of an outer surface of the lower cover.

8. The lamp-equipped vehicle outer mirror according to claim 7, wherein the lower cover includes a part disposed between the downward inclined surface and the light emitting section, and the part includes the lusterless surface or the surface having an inclination angle that is different from that of the downward inclined surface.

* * * * *